United States Patent
Niass et al.

(10) Patent No.: US 10,240,101 B2
(45) Date of Patent: Mar. 26, 2019

(54) PROCESS FOR COMBUSTION OF HEAVY OIL RESIDUE

(71) Applicant: Saudi Arabian Oil Company, Dhahran (SA)

(72) Inventors: Tidjani Niass, Dhahran (SA); Mourad Victor Younes, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/336,867

(22) Filed: Oct. 28, 2016

(65) Prior Publication Data

US 2017/0044454 A1   Feb. 16, 2017

Related U.S. Application Data

(63) Continuation-in-part of application No. PCT/US2015/029664, filed on May 7, 2015, and a
(Continued)

(51) Int. Cl.
*C10L 10/08* (2006.01)
*C10L 1/12* (2006.01)
(Continued)

(52) U.S. Cl.
CPC ............. *C10L 10/08* (2013.01); *C10L 1/1233* (2013.01); *C10L 10/14* (2013.01); *F23K 5/04* (2013.01);
(Continued)

(58) Field of Classification Search
CPC combination set(s) only.
See application file for complete search history.

(56) References Cited

U.S. PATENT DOCUMENTS 2,623,596 A    12/1952  Whorton et al.
4,105,418 A *   8/1978  Mohnhaupt ........... C10L 1/1826
                                                          44/313
(Continued)

FOREIGN PATENT DOCUMENTS

CA        2019760 A      12/1990
DE   102010026792 A1      1/2012
(Continued)

OTHER PUBLICATIONS

PCT/US2014/027172, International Search Report and Written Opinion dated Jul. 1, 2014, 10 pages.
(Continued)

*Primary Examiner* — Ellen M McAvoy
*Assistant Examiner* — Chantel L Graham
(74) *Attorney, Agent, or Firm* — Abelman, Frayne & Schwab

(57) ABSTRACT

The processes and systems herein described enable the use of $CO_2$ to handle heavy oil fractions. A significant reduction in the requisite energy to maintain such a fuel in fluid form is attained. The energy reduction from herein described residue handling systems facilitate increased combustion plant efficiency and reduced $CO_2$ emissions. The residue handling system is useful in refineries, power generation plants and other processes utilizing heavy oil residues as a feed.

12 Claims, 4 Drawing Sheets

Related U.S. Application Data continuation-in-part of application No. 14/215,204, filed on Mar. 17, 2014, now abandoned.

(60) Provisional application No. 61/989,665, filed on May 7, 2014, provisional application No. 61/799,077, filed on Mar. 15, 2013.

(51) Int. Cl.
  *F23K 5/08*   (2006.01)
  *C10L 10/14*  (2006.01)
  *F23K 5/04*   (2006.01)

(52) U.S. Cl.
  CPC .......... *F23K 5/08* (2013.01); *C10G 2300/302* (2013.01); *C10L 2200/0286* (2013.01); *C10L 2230/14* (2013.01); *C10L 2230/22* (2013.01); *C10L 2270/02* (2013.01); *C10L 2270/10* (2013.01); *C10L 2290/145* (2013.01); *C10L 2290/24* (2013.01); *F23K 2301/103* (2013.01); *Y02E 20/324* (2013.01)

(56) References Cited

U.S. PATENT DOCUMENTS

| | | | |
|---|---|---|---|
| 5,076,357 | A | 12/1991 | Marquis |
| 5,170,727 | A * | 12/1992 | Nielsen ................ B05B 7/32 110/238 |
| 2002/0100500 | A1 | 8/2002 | Briggeman |
| 2011/0114340 | A1 | 5/2011 | Segerstrom |
| 2011/0266196 | A1 | 11/2011 | Gauthier et al. |
| 2012/0304905 | A1 | 12/2012 | Periasamy et al. |
| 2013/0092062 | A1 | 4/2013 | Matsuda et al. |
| 2013/0319303 | A1 | 12/2013 | Heinz et al. |

FOREIGN PATENT DOCUMENTS

| | | |
|---|---|---|
| EP | 0760451 A2 | 3/1997 |
| FR | 2484603 A2 | 12/1981 |
| GB | 2441529 A | 3/2008 |
| JP | S6069400 A | 4/1985 |
| WO | 2014152293 A1 | 9/2014 |

OTHER PUBLICATIONS

PCT/US2015/029664, International Search Report and Written Opinion dated Jul. 13, 2015, 9 pages.

* cited by examiner

PROCESS FOR COMBUSTION OF HEAVY OIL RESIDUE

RELATED APPLICATIONS

This application
is a continuation-in-part under 35 USC § 365(c) of PCT Patent Application No. PCT/US15/029664 filed May 7, 2015, which claims the benefit of priority to provisional patent application number U.S. Patent Application Ser. No. 61/989,665 filed May 7, 2014, and
is a continuation-in-part of U.S. patent application Ser. No. 14/215,204 filed Mar. 17, 2014, which claims the benefit of priority to provisional patent application number U.S. Patent Application Ser. No. 61/799,077 filed Mar. 15, 2013, the contents of which are all incorporated herein by reference.

BACKGROUND OF THE INVENTION

Field of the Invention

The present invention relates to systems and processes for handling heavy oil residue in conjunction with combustion or other processes utilizing heavy oil residue as a feed.

Description of Related Art

Heavy oil fractions are produced at various stages in a refinery such as vacuum distillation, visbreaking, solvent deasphalting and fluid catalytic cracking. These fractions are useful as feedstocks for further refining or conversion processes and as fuel for combustion plants. Heavy oil fractions exhibit very high viscosities and levels of impurities, such as sulfur and metals. Thus conventional processes require substantial energy expenditure to make the material fluid to fit the combustion environment so that combustion efficiency is maximized, solids retention in the combustion burners is minimized, and solid particulate flue emissions is minimized. For instance, at ambient conditions, a typical vacuum residue can have a viscosity in the range of 50,000,000 centistokes, similar to some solid materials under comparable ambient conditions. Therefore, residue must be conditioned, generally by heating, to convert it into a condition suitable for pumping and injection to the combustion burners.

Heating heavy oil fractions requires energy, typically in the form of steam and/or electricity. Heating systems generally include heated storage tanks, pumps and heated transport pipes. The necessary temperature increase is accomplished with electric tracing or steam in an effort to maintain all of the heavy oil in a fluid state. Continuous motion of the heavy oil is also employed to avoid dead zones in the piping network. The entire handling system is also typically insulated to avoid cold zones that could result in increased viscosity and plugging.

Therefore, when the additional energy expenditure is subtracted from the combustion plant power output, the overall efficiency is reduced.

Accordingly, there exists a need for more efficient processes for handling heavy oil residue feedstocks by reducing the amount of external thermal energy required to maintain the material in a fluid and flowable state. There also exists a need for more efficient processes for using heavy oil residue feeds in combustion processes to increase combustion plant efficiency. There exists a further need for combustion processes with reduced $CO_2$ emissions.

SUMMARY OF THE INVENTION

In accordance with one or more embodiments, the invention relates to processes and systems that utilize $CO_2$ to reduce the viscosity of heavy oil residue feeds.

In accordance with one or more further embodiments, a heavy oil residue handling system is provided including one or more storage tanks and one or more pumps and a source of gaseous $CO_2$ which is provided to saturate the heavy oil residue to reduce the viscosity of the residue, thereby reducing the energy required to pump and/or transport the material.

The processes and systems herein described enable the use of $CO_2$ to handle heavy oil fractions which cannot be atomized at ambient conditions (e.g., in the range of about 20° C. to about 25° C., or other conditions of the surrounding air without external application of heating or cooling systems). In certain embodiments, a significant reduction in the requisite energy to maintain such a fuel in fluid form is attained. The energy reduction from herein described residue handling systems facilitate increased combustion plant efficiency and reduced $CO_2$ emissions. The residue handling system is useful in refineries, power generation plants and other processes utilizing heavy oil residues as a feed.

The integrated systems and processes described herein facilitate the reduction in energy usage to maintain the heavy oil residues in fluid form suitable for transport via pipeline, and/or injection through the burner, and related upstream systems. In such a combustion system, one or more $CO_2$ capture sub-systems are employed to provide captured $CO_2$ that is used to reduce the viscosity of the heavy oil residue and facilitate maintenance of the material in a fluid state and having predetermined flow characteristics. The viscosity reduction using $CO_2$ allows the overall residual oil handling systems to reduce steam and/or electricity consumption. In addition, the temperature and pressure of steam used to atomize fuel in the combustion systems can be reduced resulting in energy savings.

New and existing $CO_2$ capture and sequestration technologies are available to reduce overall $CO_2$ emissions and provide incentives such as carbon credits and providing a source of $CO_2$ as a raw material, coolant or the like. In a capture and sequestration plant, captured $CO_2$ is compressed and sequestrated underground to avoid its release to the atmosphere.

U.S. Pat. No. 5,076,357 and U.S. Pat. No. 2,623,596, which are incorporated herein by reference in their entireties, disclose use of $CO_2$ to enhance oil recovery when injected in subterranean oil reservoirs by reducing the viscosity of the crude oil while it is still in the ground.

The residue handling systems described herein are suitable for combustion plants in which heavy oil residue is burned to produce power, steam or heat. Further, the residue handling systems include certain embodiments in which all or a portion of the $CO_2$ used is derived from known and commercially available sources, and certain embodiments in which all or a portion of the $CO_2$ used is derived from an integrated $CO_2$ capture and sequestration system, which can be integrated within the combustion plant and/or in one or more additional $CO_2$-producing processes, e.g., within a refinery, industrial facility, commercial or residential property heating systems or the like.

In additional embodiments, residue handling systems can be provided in an automobile, locomotive or marine vessel that uses heavy oil residue as a direct or ancillary fuel source. In such embodiments the residue handling system can obtain all or a portion of the $CO_2$ used from a known source, such as refillable on-board permanent or portable storage tanks.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in, and constitute a part of this specification. The drawings, together with the remainder of the specification, serve to explain principles and operation of the described and claimed aspects and embodiments.

BRIEF DESCRIPTION OF THE DRAWINGS

The foregoing summary as well as the following detailed description will be best understood when read in conjunction with the attached drawings. For the purpose of illustrating the invention, there are shown in the drawings embodiments which are presently preferred. It should be understood, however, that the invention is not limited to the precise arrangements and apparatus shown. In the drawings, the same numeral is used to refer to the same or similar elements, in which.

DETAILED DESCRIPTION OF THE INVENTION

The above objects and further advantages are provided by the processes and systems of the invention described herein which utilize $CO_2$ addition to reduce viscosity and thereby to facilitate the handling of heavy oil residues as combustion fuel or feedstocks to other processes. The residue handling system described herein can be integrated in combustion chambers using air, oxygen or oxygen-enriched air combustion chambers, other types of combustion processes, or reforming processes using heavy oil residue as a feedstock.

In the processes described herein, $CO_2$ is dissolved in heavy oil. This mixture is fed to an atomizer nozzle. Exiting the nozzle burner tip, the dissolved $CO_2$ will "evaporate" when the fuel is injected in the combustion chamber, due to the rapid pressure reduction, and bursting the atomized fuel droplet. The expansion of $CO_2$ in the atomized droplets will be instantaneous as the pressure is reduced when the fuel is injected through the atomizer tip. Accordingly, $CO_2$ addition enhances the atomization of heavy oil, increases the combustion effectiveness, and reduces the particulates emissions since more complete combustion can be achieved.

Figure 1:
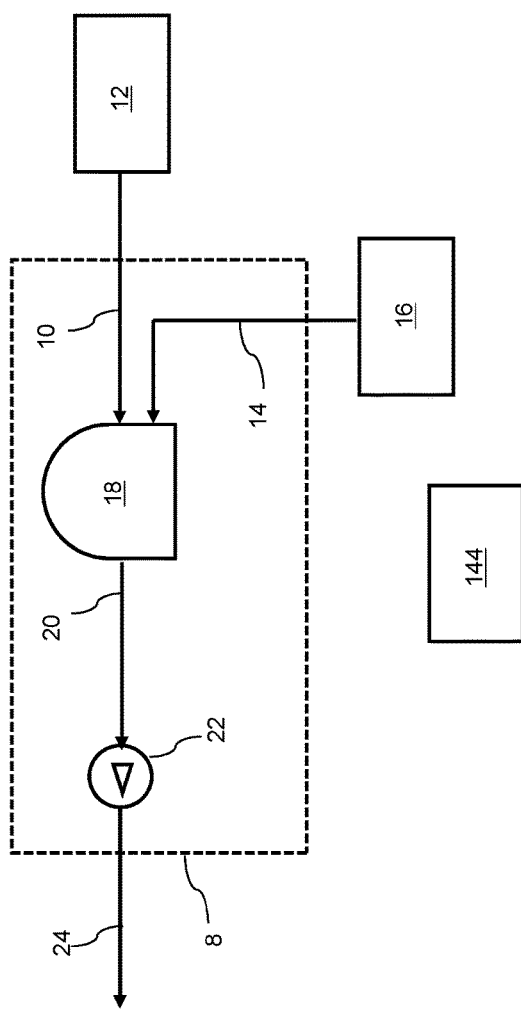
FIG. 1 is a process flow diagram of a heavy residue handling system described herein.

FIG. 1 is a process flow diagram of a heavy residue handling system 8 described herein. In general a stream 10 of $CO_2$ from a $CO_2$ source 12 is mixed with a heavy oil residue stream 14 from a source 16 of heavy oil residue in a storage tank 18. The source 12 of $CO_2$ in certain embodiments can be a suitable external source and/or an integrated $CO_2$ capture subsystem. A sufficient quantity of $CO_2$ is provided in stream 10 for mixing with the heavy residue stream 14 at suitable operating conditions of temperature and pressure and a purity level compatible therewith to effectively dissolve the $CO_2$. The amount of $CO_2$ which can be dissolved in a given type of heavy oil residue can readily be determined by one of ordinary skill in the art in laboratory tests under various conditions of temperature and pressure. For instance, a $CO_2$ stream can be provided having: a purity of about 50% to about 100%, in certain embodiments about 70% to about 100% and in further embodiments about 90% to about 100%; a pressure in the range of about 5 bar to about 100 bar, in certain embodiments about 20 bar to about 73 bar and in further embodiments about 73 bar to about 100 bar; and at a temperature in the range of about 0° C. to about 400° C., in certain embodiments about 32° C. to about 300° C. and in further embodiments about 32° C. to about 200° C. These conditions permit saturation of the heavy oil residue by the $CO_2$ in the range of about 5 bar to about 100 bar, about 5 bar to below about 73 bar, or about 20 bar to below about 73 bar. In certain embodiments, the $CO_2$ purity is selected based on the technology utilized as the $CO_2$ source, e.g., greater than or equal to 90% for $CO_2$ derived from $CO_2$ capture systems, and 70% to 90% is a concentration that could be found in flue gases exiting an oxyboiler. Concerning pressure of the $CO_2$, up to 20 bar represents a low pressure range that could be suitable for oil storage in embodiments in which $CO_2$ is stored in a tankers, e.g., a 20 bar tanker. Pressure levels in the range of less than about 73 bar are suitable to maintain $CO_2$ below supercritical pressure conditions. Concerning the temperature, ranges below 32° C. represents levels below $CO_2$ critical point temperature; a range of 32° C. to 300° C. includes $CO_2$ derived from a compressor with or without cooling; ranges greater than or equal to 300° C. include operations in which higher compression or high recirculation temperatures are employed.

The heavy oil residue feed is supplied to the storage tank 18 via stream 14. The viscosity of the heavy oil and dissolved $CO_2$ mixture in the storage tank 18 has undergone a significant viscosity reduction. At this stage the viscosity reduction attained by the mixture of $CO_2$ and heavy oil residue reduces the requisite pump energy requirements to transport the material. The viscosity of the heavy oil and $CO_2$ mixture in the storage tank ST can be in the range of about 10 centi Stokes (cSt) to about 2000 cSt, in certain embodiments about 10 cSt to about 300 cSt and in further embodiments about 10 cSt to about 100 cSt. In certain embodiments an appropriate viscosity level is in the range of 20 cSt.

The viscosity ranges used herein can be selected based upon the type of application. 10 cSt to 100 cSt is effective for transport and injection of the oil in a burner nozzle; 10 cSt to 300 cSt is a viscosity range suitable for centrifugal pumps and storage; 300 cSt to 2000 cSt is a viscosity range suitable for storage and pumping.

A combined stream of heavy oil and dissolved $CO_2$, stream 20, is charged to a pump 22 for transport and if necessary compression of $CO_2$ to provide a stream 24 of heavy oil and dissolved $CO_2$. Depending on the final viscosity value required for the end use of the heavy oil residue, the mixture can be heated to further reduce the viscosity. In accordance with the process herein, the amount of heating that is required to attain the desired viscosity level is reduced, and the requisite pump energy requirements and heat tracing hardware are also reduced. For instance, in combustion systems it is desirable to reduce the level to the appropriate atomization viscosity, e.g., in the range of from about 10 cSt to about 2000 cSt, in certain embodiments about 10 cSt to about 300 cSt and in further embodiments about 10 cSt to about 100 cSt. In certain embodiments an appropriate viscosity level is in the range of 20 cSt.

In certain embodiments, one more separate or in-line (static or dynamic) mixing units can be provided, for instance, downstream of storage tank 18. In further embodiments the compression in pump 22 provides suitable mixing to reduce the viscosity of the heavy residue. The compressed heavy residue/$CO_2$ mixture 24 serves as a suitable feed, for instance, to a combustion system as described herein, or for a reforming or conversion process to convert the heavy residue into other hydrocarbon products.

Figure 2:
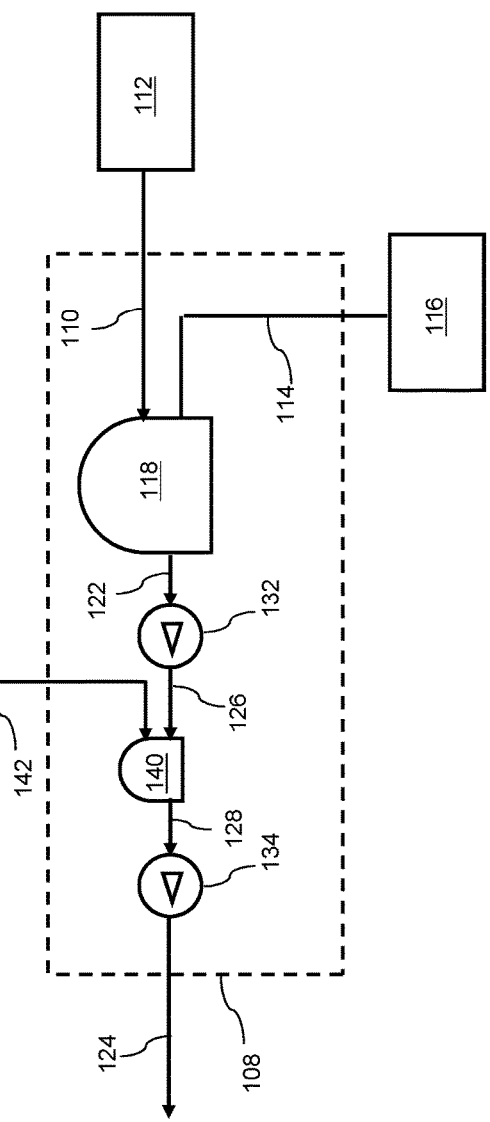
FIG. 2 is a process flow diagram of another embodiment of a heavy residue handling system described herein.

FIG. 2 is a process flow diagram of a further embodiment of a heavy residue handling system 108 described herein. In general, a first stream 110 of $CO_2$ from a $CO_2$ source 112 is mixed with a heavy oil residue stream 114 from a source 116 of heavy oil residue in a storage tank 118. The source 112 of $CO_2$ in certain embodiments can be a suitable external source and/or an integrated $CO_2$ capture subsystem. A sufficient quantity of $CO_2$ is provided in stream 110 for mixing with the heavy residue stream 114 at suitable operating conditions and a purity level compatible therewith to effectively dissolve the $CO_2$, as disclosed herein.

The heavy oil residue feed is supplied to the storage tank 118 via stream 114. The viscosity of the heavy oil and $CO_2$ mixture in the storage tank 118 is substantially reduced. At this stage the viscosity reduction attained by the mixture of $CO_2$ with the heavy oil residue reduces the requisite pump energy requirements to transport the material.

A combined stream of heavy oil and $CO_2$, stream 122, is charged to a first pump 132 for transport and, if necessary, compression of $CO_2$. A compressed combined stream 126 from first pump 132 is then charged to one or more mixing or storage units 140 along with additional $CO_2$ via a stream 142 from a source of $CO_2$ 144. In certain embodiments, unit 140 is a mixing tank. In further embodiments, unit 140 is an in-line static or dynamic mixer. In further embodiments, unit 140 is a storage tank of comparatively smaller capacity as compared to tank 118 in which $CO_2$ can be blended with the oil heavy residue blend. An effluent 128 from unit 140 is transported via a second pump 134 to provide a heavy residue/$CO_2$ mixture 124 which serves as a suitable feed, for instance, to a combustion system as described herein.

In general, it is desirable to provide fluids for pumping that have viscosity values in the range of about 1000 to about 2000 cSt. For oil, it is common to provide the fluid at a viscosity of about 100 cSt for pumping. As described herein, to attain the desired level of 100 cSt without using the viscosity reduction described herein, the temperature should be at or above 124° C., whereas using the process described herein the temperature can be as low as 35° C. for 60 bar saturation $CO_2$ pressure blend. In certain embodiments ranges of conditions as disclosed above are effective.

Figure 3:
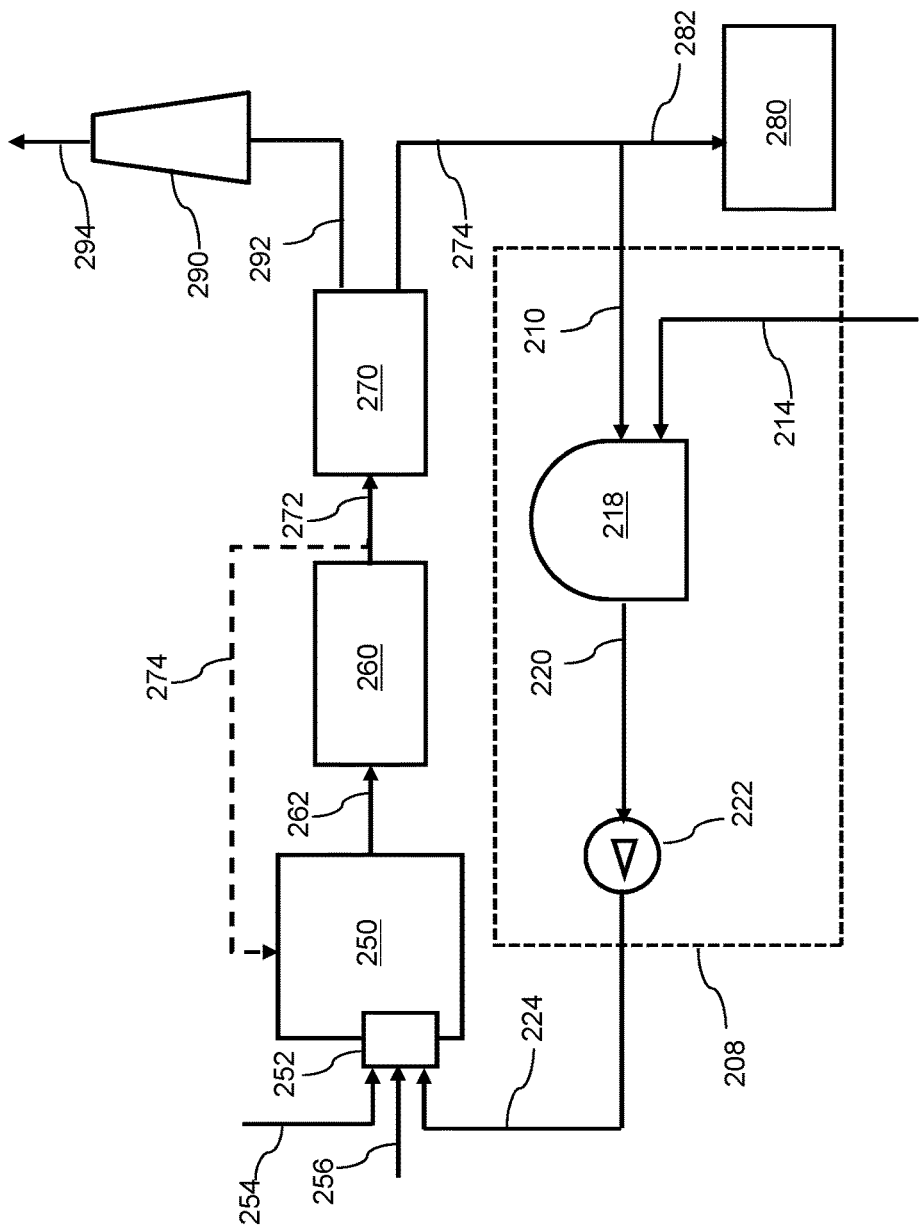
FIG. 3 is a process flow diagram of a combustion system including the residue handling system integrating the $CO_2$ viscosity reduction process described herein.

FIG. 3 is a process flow diagram of a combustion system including a heavy residue handling system 208, e.g., as which can be the same or similar to that which is shown and described with respect to FIG. 1. The combustion system integrates $CO_2$ viscosity reduction and generally includes a combustion chamber 250 equipped with one or more burners 252; one or more flue gas treatment units 260; a $CO_2$ capture unit 270; heavy oil residue handling system 208 which includes one or more storage tanks 218 and one or more pumps 222; a $CO_2$ sequestration or utilization unit 280; and a stack 290 to vent remaining flue gases.

Air, oxygen or oxygen-enriched air are supplied via stream 254 to one or more burners 252 along with a heavy oil residue/$CO_2$ mixture via stream 224 and a steam stream 256 used for fuel atomization to ensure a proper combustion of the fuel in the combustion chamber 250. In certain alternative embodiments, atomizing media other than, or in conjunction with, steam can be used, such as $CO_2$ or another suitable atomizing gas.

The flue gases exit the combustion chamber 250 via stream 262 to enter one or more flue gas treatment units 260. While not shown, it is understood by those skilled in the art the flue gas treatment unit 260 can include one or more of each of particulate removal units, sulfur oxides removal units, heavy metal removal units, and nitrogen oxides removal units.

The effluent flue gases from flue gas treatment unit(s) 260, stream 272, are charged to the $CO_2$ capture unit 270 in which a requisite amount of $CO_2$ is removed from the main flue gas stream. Part of the flue gases derived from stream 272 can optionally be recycled to the combustion chamber to enhance combustion (as indicated by stream 274 shown in dashed lines), particularly in embodiments in which the combustion chamber relies on oxygen or oxygen-enriched air.

A $CO_2$-lean flue gas stream exits the $CO_2$ capture unit 270, stream 292, and is passed to the stack 290 and then discharged to atmosphere via a stream 294 as is known.

The captured $CO_2$ exits the $CO_2$ capture unit 270 via stream 274 and is divided into a stream 282 charged to the $CO_2$ sequestration or utilization unit ($CO_2$-S/U) and a stream 210 charged to the heavy oil residue storage tank 218.

Heavy oil residue feed is supplied to the storage tank 218 via a stream 214. The $CO_2$ is mixed with the heavy oil residue to reduce its viscosity, thereby reducing the requisite pump energy requirements, heat tracing hardware and requisite heating energy to allow the blend reaching the appropriate atomization viscosity, e.g., in the range of from about 10 cSt to about 2000 cSt, in certain embodiments about 10 cSt to about 300 cSt and in further embodiments about 10 cSt to about 100 cSt. In certain embodiments an appropriate viscosity level is in the range of 20 cSt.

The heavy oil residue/$CO_2$ mixture leaves the storage tank 218 via the pump 222 suction line 220. The stream 224 is fed under pressure to the combustion chamber burner(s) 252.

Figure 4:
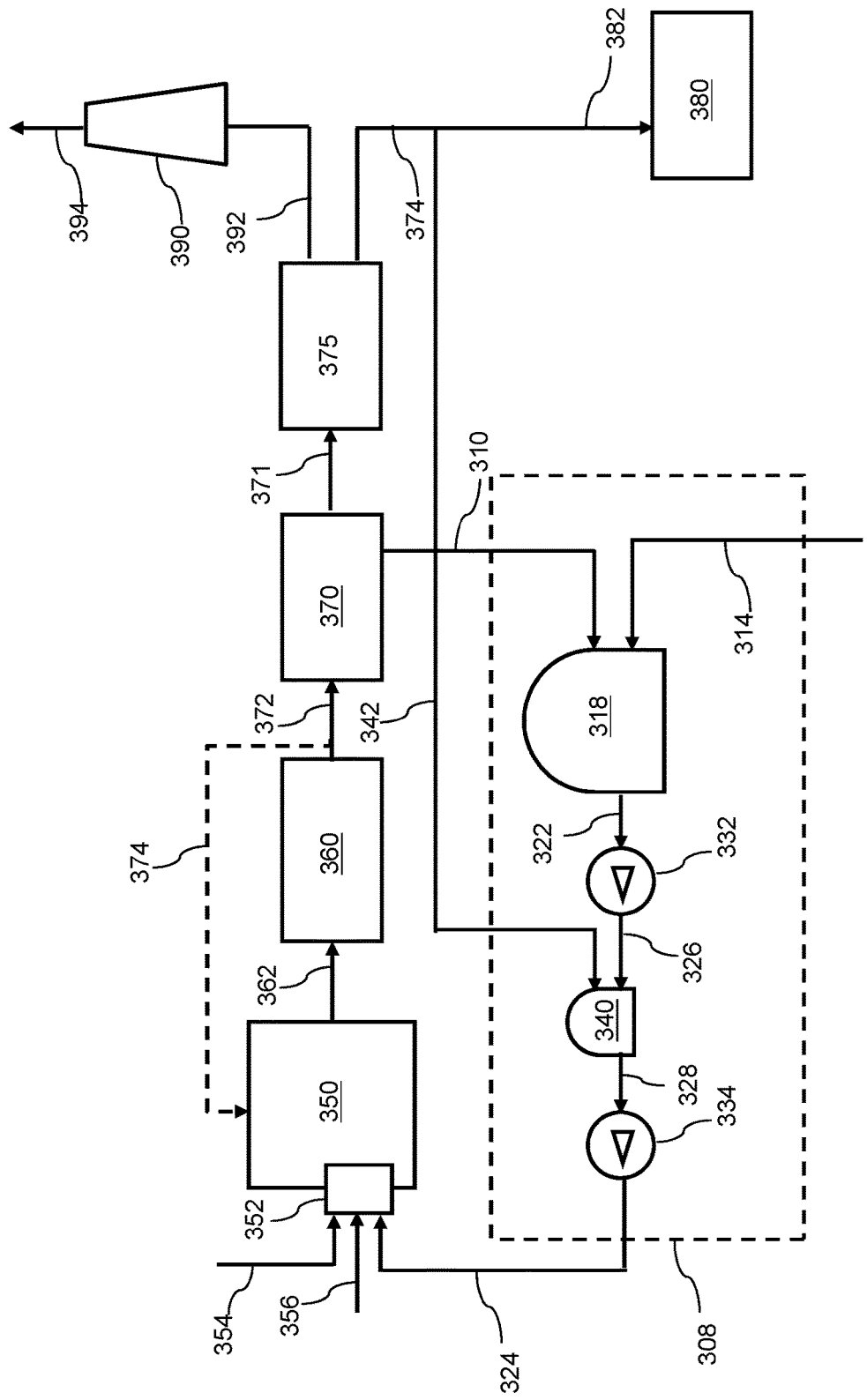
FIG. 4 is a process flow diagram of another embodiment of a combustion system including the residue handling system integrating a $CO_2$ viscosity reduction step described herein.

FIG. 4 is a process flow diagram of another embodiment of a combustion system including a residue handling system 308, e.g., as which can be the same or similar to that which is shown and described with respect to FIG. 2. The combustion system integrates $CO_2$ viscosity reduction and generally includes a combustion chamber 350 equipped with one or more burners 352; one or more flue gas treatment units 360; plural $CO_2$ capture units 370 and 375; heavy oil residue handling system 308 which includes one or more storage tanks 318, one or more mixing or storage units 340 and plural pumps (332 and 334); a $CO_2$ sequestration or utilization unit 380; and a stack 390 to vent remaining flue gases.

As described above with reference to FIG. 3, air, oxygen or oxygen-enriched air are supplied via stream 354 to one or more burners 352 along with a heavy oil residue/$CO_2$ mixture via stream 324 and a steam stream 356 used for fuel atomization to ensure a proper combustion of the fuel in the combustion chamber 350, and flue gases exit the combustion chamber 350 via a stream 362 to enter one or more flue gas treatment units 360. In certain alternative embodiments, atomizing media other than, or in conjunction with, steam can be used, such as $CO_2$ or another suitable atomizing gas.

The effluent flue gases from the flue gas treatment unit(s) 360, stream 372, are charged to a first $CO_2$ capture unit 370. A requisite amount of $CO_2$, stream 310, is removed from the main flue gas stream for introduction into storage tank 318 to maintain equilibrium therein. The quantity removed from the first $CO_2$ capture unit 370 is determined by the requisite amount of viscosity reduction and process economic considerations, e.g., the cost or removing quantities of $CO_2$ beyond a predetermined level. The $CO_2$ capture rate is at a level that is effective for process economics and design, and can be dependent on the selected $CO_2$ capture technology. Further, the quantity of $CO_2$ that is removed from system 370 via stream 310 to reduce the viscosity of the oil is considered. The $CO_2$ capture rate can be from about 40% to about 100%, in certain embodiments from about 70% to about 99.9% and in further embodiments from about 90% to about 99%. Concerning the amount of $CO_2$ that is recycled to tank 318, this quantity can be dependent on the selected fuel and on the selected $CO_2$ capture rate. The $CO_2$ is compressed (not shown) to the desired pressure as discussed above and is conveyed to the storage tank 318 via stream 310.

The $CO_2$ is mixed with the heavy oil residue from stream 314 to reduce its viscosity, thereby reducing the requisite pump energy requirements, heat tracing hardware and requisite heating energy to assure that the blend reaches the desired atomization viscosity, e.g., in the range of from about 10 cSt to about 2000 cSt, in certain embodiments about 10 cSt to about 300 cSt and in further embodiments about 10 cSt to about 100 cSt. In certain embodiments an appropriate viscosity level is in the range of 20 cSt.

Part of the flue gases derived from stream 372 can optionally be recycled to the combustion chamber 350 to enhance combustion (as indicated by stream 374 shown in dashed lines), particularly in embodiments in which the combustion chamber relies on oxygen or oxygen-enriched air. The remaining $CO_2$-lean flue gas stream exits the first $CO_2$ capture unit 370, stream 371, and is passed to the second $CO_2$ capture unit 375 in which where the $CO_2$ is recovered and compressed to the required pressure. A $CO_2$ lean flue gas stream 392 exits the second $CO_2$ capture unit 375 and is passed to the stack 390 and then discharged to atmosphere via a stream 394 as is known.

The captured $CO_2$ exits the second $CO_2$ capture unit 375 via a stream 374 and is divided into a stream 382 charged to the $CO_2$ sequestration or utilization unit 380 and a stream 342 charged to a unit 340. In certain embodiments, unit 340 is a static or dynamic mixer. In further embodiments, unit 340 is a storage tank of comparatively smaller capacity as compared to tank 318 in which $CO_2$ is be blended with the oil heavy residue blend.

The heavy oil residue feed is supplied to the storage tank 318 via stream 314. The $CO_2$ is mixed with the heavy oil residue to reduce its viscosity, thereby reducing the requisite pump energy requirements, heat tracing hardware and requisite heating energy to assure that the blend reaches the desired viscosity. In a two-step viscosity reduction scheme, the viscosity reduction in the first step carried out to attain a viscosity level in the range of from about 50 cSt to about 2000 cSt, in certain embodiments from about 50 cSt to about 1000 cSt and in further embodiment from about 50 cSt to about 300 cSt.

The heavy oil residue/$CO_2$ mixture leaves the storage tank 318 via pump 332 suction line 322 and is compressed and transferred to unit 340 via stream 326. The heavy oil residue/$CO_2$ mixture stream 326 is mixed with additional $CO_2$ via stream 342 to provide additional viscosity reduction and further reducing the heating hardware and energy requirements to allow the blend reaching the appropriate atomization viscosity, e.g., in the range of from about 10 cSt to about 2000 cSt, in certain embodiments about 10 cSt to about 300 cSt and in further embodiments about 10 cSt to about 100 cSt. In certain embodiments an appropriate viscosity level is in the range of 20 cSt.

The heavy oil residue/$CO_2$ mixture leaves unit 340 via pump 334 suction line 328 and is compressed and transferred to the combustion chamber burner(s) 352 via stream 324.

Figure 5:
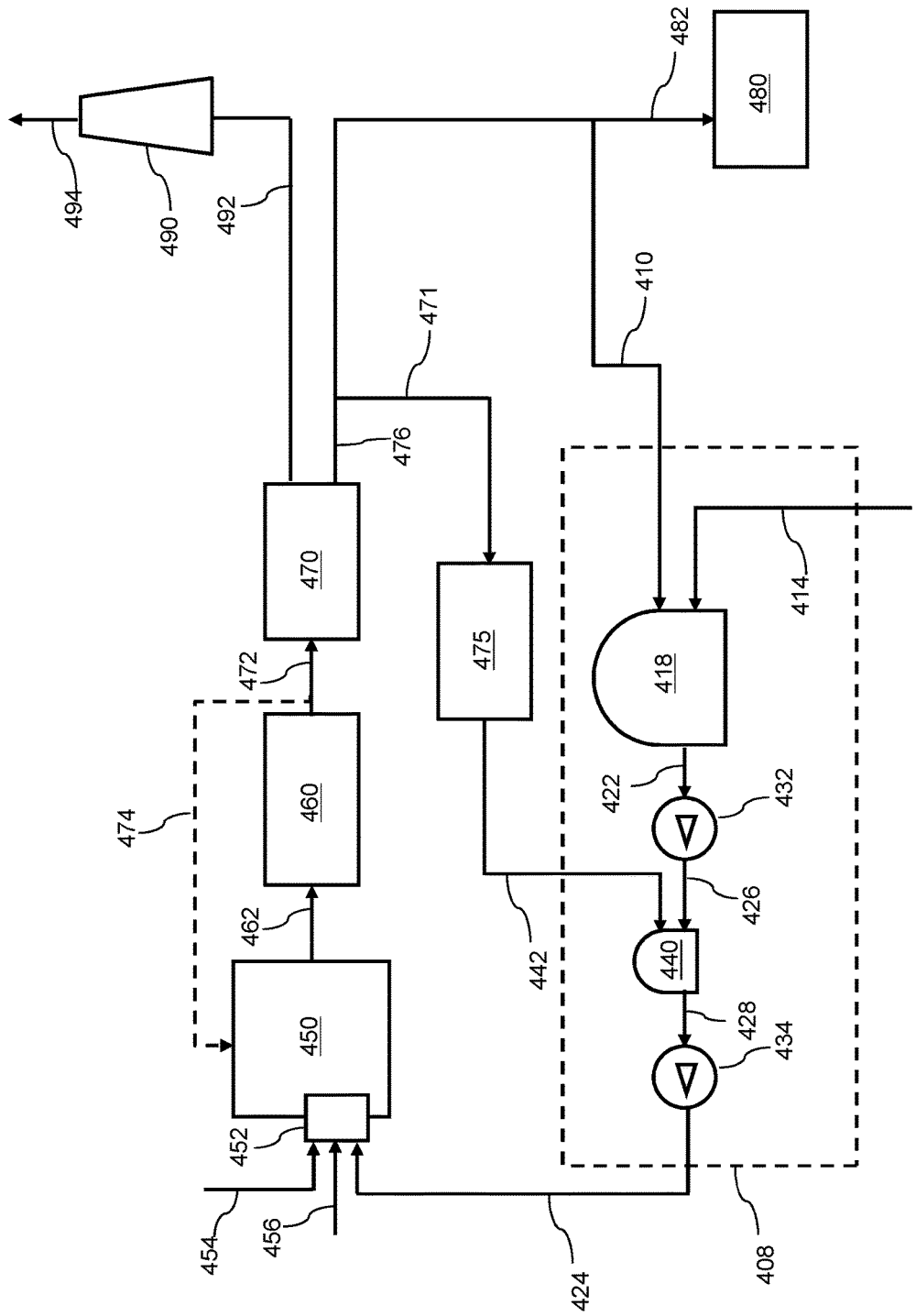
FIG. 5 is a process flow diagram of a further embodiment of a combustion system including the heavy oil residue handling system integrating the $CO_2$ viscosity reduction step described herein.

FIG. 5 is a process flow diagram of a further embodiment of a combustion system including a residue handling system 408, e.g., as which can be the same or similar to that which is shown and described with respect to FIG. 2. The combustion system integrates $CO_2$ viscosity reduction and generally includes a combustion chamber 450 equipped with one or more burners 452; one or more flue gas treatment units 460; plural $CO_2$ capture units (470 and 475); heavy oil residue handling system 408 which includes one or more storage tanks 418, one or more mixing or storage units 440 and plural pumps (432 and 434); a $CO_2$ sequestration or utilization unit 480; and a stack 490 to vent remaining flue gases.

As described with respect to FIG. 3, air, oxygen or oxygen-enriched air are supplied via stream 454 to one or more burners 452 along with a heavy oil residue/$CO_2$ mixture via stream 424 and a steam stream 456 used for fuel atomization to ensure a proper combustion of the fuel in the combustion chamber 450, and flue gases exit the combustion chamber 450 via a stream 462 to enter one or more flue gas treatment units 460. In certain alternative embodiments, atomizing media other than, or in conjunction with, steam can be used, such as $CO_2$ or another suitable atomizing gas.

The effluent flue gases from the flue gas treatment unit(s) 460, stream 472, are charged to a first $CO_2$ capture unit 470. An off-gas stream exits the first $CO_2$ capture unit 470 via a stream 492 to the stack 490 and then to atmosphere via stream 494. Note that the off-gas stream 492 is relatively $CO_2$ lean as compared to stream 476 described herein. For example, the off-gas stream 492 can contain 55% $CO_2$, and be leaner than stream 476 that can contain 99% $CO_2$. However, the same stream can be considered rich in $CO_2$ as compared to other streams.

Part of the flue gases derived from stream 472 can optionally be recycled to the combustion chamber to enhance combustion (as indicated by stream 474 shown in dashed lines), particularly in embodiments in which the combustion chamber relies on oxygen or oxygen-enriched air.

Captured $CO_2$ exits the first $CO_2$ capture unit 470 via a stream 476 to feed $CO_2$ sequestration or utilization unit 480 via stream 482, heavy oil residue storage tank 418 via stream 410, and the second $CO_2$ processing unit 475 via stream 471.

The heavy oil residue is supplied to the storage tank 418 via stream 414. The $CO_2$ feed from the first $CO_2$ capture unit 470 via stream 410 is mixed with the heavy oil residue. The $CO_2$ is mixed with the heavy oil residue to reduce its viscosity, thereby reducing the requisite pump energy requirements, heat tracing hardware and requisite heating energy to assure that the fuel reaches the desired viscosity. In a two-step viscosity reduction scheme, the viscosity reduction in the first step carried out to attain a viscosity level in the range of about 50 cSt to about 2000 cSt, in certain embodiments from about 50 cSt to about 1000 cSt and in further embodiment from about 50 cSt to about 300 cSt.

The heavy oil residue/CO$_2$ mixture leaves storage tank 418 via pump 432 suction line 422 and is compressed and transferred to unit 440 via stream 426. In certain embodiments, unit 440 is a static or dynamic mixer. In further embodiments, unit 440 is a storage tank of comparatively smaller capacity as compared to tank 418 in which CO$_2$ is be blended with the oil heavy residue blend. The heavy oil residue/CO$_2$ mixture stream 426 is mixed with additional CO$_2$ to achieve additional viscosity reduction and further reducing the heating hardware and energy requirements to assure that the blend reaches the appropriate atomization viscosity, e.g., in the range of from about 10 cSt to about 2000 cSt, in certain embodiments about 10 cSt to about 300 cSt and in further embodiments about 10 cSt to about 100 cSt. In certain embodiments an appropriate viscosity level is in the range of 20 cSt.

The CO$_2$ stream 471 enters the second CO$_2$ capture unit 475 to be compressed to the required pressure for unit 440 and then exits the second CO$_2$ capture unit 475 to feed unit 475 via stream 442. The heavy oil residue/CO$_2$ mixture leaves unit 440 via pump 434 suction line 428 and is compressed and transferred to the combustion chamber burner(s) 452 via stream 424.

In certain embodiments, the heavy oil residue/CO$_2$ mixture viscosity can attain the viscosity atomization level without requiring external heating. In such cases, mechanical atomization fuel injectors, or non-assisted atomization fluid, can be used instead of, or in conjunction with, steam atomization injectors to conserve steam (e.g., from streams 256, 356 and 456 described herein). In certain embodiments steam and/or another suitable atomizing gas can be used in conjunction with mechanical atomization injectors with a primary purpose of controlling the temperature of the burner to avoid or minimize the likelihood of coking, rather than atomization as in embodiments in which mechanical atomization fuel injectors are not used.

For the purpose of this simplified schematic illustration and description, the numerous valves, temperature sensors, electronic controllers and the like that are customarily employed and well known to those of ordinary skill in the art of the unit operations described herein are not included. Further, accompanying components that are in the unit operations including combustion processes such as, for example, air or oxygen supplies and flue gas handling are not shown.

Advantageously, the use of CO$_2$ as described herein solves the problem of reducing the amount of energy required for heavy oil residue handling in combustion plants burning such residues. Indeed, in conventional combustion plants using heavy oil residues as fuel, fuel handling requires use of additional energy in the form of electricity or steam. The present system and method permits significant energy reduction by using CO$_2$ to decrease the fuel viscosity and ensure its proper handling. In further embodiments herein, CO$_2$ used for heavy oil residue handling is derived from integrated CO$_2$ capture systems. In conventional CO$_2$ capture and sequestration processes using heavy oil residues as a fuel, the CO$_2$ is injected underground for storage, while additional energy is used for fuel handling. Use of the present system and method in combustion plants integrating CO$_2$ capture permits a portion of the captured CO$_2$ to be used to facilitate effective feedstock handling and minimizing the requisite additional energy for such handling.

The initial feedstock for use in above-described apparatus and process can be a crude or partially refined oil product obtained from various sources. The source of feedstock can be crude oil, synthetic crude oil, bitumen, oil sand, shale oil, coal liquids, or a combination including one of the foregoing sources. For example, the feedstock can be a straight run gas oil or other refinery intermediate stream such as vacuum gas oil, deasphalted oil and/or demetalized oil obtained from a solvent deasphalting process, light coker or heavy coker gas oil obtained from a coker process, cycle oil obtained from an FCC process separate from the integrated FCC process described herein, gas oil obtained from a visbreaking process, or any combination of the foregoing products. In certain embodiments, vacuum gas oil is a suitable feedstock for the integrated process. A suitable feedstock contains hydrocarbons having boiling point of about 36° C. to about 650° C. and in certain embodiments in the range of about 350° C. to about 565° C.

Example 1

A typical oil heavy residue is considered in this prophetic example to show the potential gain obtained when applying the process described herein in a power plant fired by heavy oil residue that has an output in the range of 600 megawatts electrical output (MWe). As a comparative example, initial heavy oil residue has a density of 1020 kg/m$^3$ at 25° C. and a viscosity of 13280 cSt at 50° C. Table 1 shows the heavy residue oil temperature at different viscosities of conventional systems, and the required temperatures to attain the same viscosities when the oil is saturated at a pressure of 20 bar CO$_2$ in a first example and a pressure of 60 bar CO$_2$ in a second example according to the system and process herein.

TABLE 1

| Oil heavy residue temperature in ° C. at different viscosities | | | |
|---|---|---|---|
| Viscosity (cSt) | 20 | 100 | 1000 |
| Temperature of original oil (° C.) | 180 | 124 | 80 |
| Temperature of the heavy oil residue at 20 bar CO$_2$ saturation (° C.) | 140 | 93 | 54 |
| Temperature of the heavy oil residue at 60 bar CO$_2$ saturation (° C.) | 75 | 35 | <Tamb* |

*Tamb: Ambient temperature

As shown in Table 1, the addition of CO$_2$ to the heavy oil residue decreases its viscosity at specific temperatures. Accordingly it is possible to reach the same blend viscosity at lower temperatures when adding CO$_2$. In particular, Table 1 shows that a suitable storage temperature for heavy oil residue is above 124° C. in the base case scenario while it can be reduced to 93° C. in the case of 20 bar saturation CO$_2$ pressure blend and to 35° C. for 60 bar saturation CO$_2$ pressure blend.

Therefore, the heat tracing requirement to maintain the temperature of the heavy oil residue, and consequently its viscosity is reduced to as low as no heat tracing requirement at 60 bar CO$_2$ saturation.

A viscosity of 20 cSt is commonly required at the burner to facilitate suitable fuel atomization and thus complete and efficient combustion. To attain this viscosity reduction according to conventional processes, a temperature of 180° C. is required, whereas it is reduced to 140° C. at 20 bar CO$_2$ saturation and further reduced to 75° C. at 60 bar CO$_2$ saturation.

The steam characteristics required are accordingly modified. For instance, without the herein described viscosity reduction, it is necessary to use, for instance, steam at 10 bar and 230° C. In contrast, steam at 6 bar and 160° C. can be used where the CO$_2$ saturation is 20 bar, and steam at 2 bar and 120° C. can be used where the $CO_2$ saturation is at 60 bar. This consequently results in reduced energy usage for steam heating and higher operation of the steam in the steam cycle, thus a higher net output for the power plant. In a typical example in the range of 600 MWe power plant, the oil heavy residue mass flow rate is around 37.5 kg/s and the required steam for fuel atomization is 30% of the fuel mass flow rate, thus around 11.25 kg/s. The difference in the steam quality/conditions will allow net savings of 1328 kilowatts of electricity (kWe) where the $CO_2$ saturation is 20 bar and 3300 kWe where the $CO_2$ saturation is 60 bar. If the compression energy of $CO_2$ and the oil heavy residue to 20 and 60 bar is considered, the net power savings would be 1183 kWe and 2798 kWe for the $CO_2$ saturation levels of 20 bar and 60 bar, respectively.

Note that with the above considerations, the steam pressure considered for atomization is lower than the heavy oil residue/$CO_2$ mixture stream. In this case, either higher steam pressure is considered or an intermediate expansion step is preferably added within the injector to allow the atomization of the heavy fuel oil at the considered temperatures and pressures. Moreover, all of the atomizing steam energy can be conserved if mechanical atomization injectors are used since the heavy fuel oil/$CO_2$ mixture is provided at high pressures.

Example 2

In addition to the savings on the steam quantity used for the atomization of the fuel, considerable savings can be realized by the reduction in the requisite heating of the fuel from the storage temperature, e.g., 100 cSt viscosity, to the burner, 20 cSt viscosity, since the heating is performed by steam extracted from the steam cycle.

In this example, the storage temperature is deemed to be the same for the three cases, i.e., 120° C., which is the storing temperature required for the comparative example. In the base case, the heavy oil residue should be heated to 180° C., whereas at 20 bar $CO_2$ it saturation is should be heated to 140° C., and no additional heating is required for $CO_2$ saturation at 60 bar.

The incremental savings on steam requirements for fuel heating would be 1335 kWe for the 20 bar saturation $CO_2$ case and 1856 kWe for the 60 bar saturation $CO_2$ case leading to total net savings of 2518 kWe in the 20 bar saturation $CO_2$ case and 4654 kWe in the 60 bar saturation $CO_2$ case.

These savings represent respectively 0.4% and 0.77% of the net power output, equivalent to increasing the net efficiency of the power plant by 0.17 and 0.32 points, respectively.

The method and system of the present invention have been described above and in the attached drawings; however, modifications will be apparent to those of ordinary skill in the art and the scope of protection for the invention is to be defined by the claims that follow.

The invention claimed is:

1. A method of improving efficiency of a combustion system utilizing a high viscosity heavy oil residue fuel, the method comprising:
   a. providing a source of $CO_2$ or a $CO_2$-rich gaseous mixture;
   b. bringing the $CO_2$ or $CO_2$-rich gaseous mixture into intimate contact with the heavy oil residue under predetermined conditions of temperature and a pressure below about 73 bar, to maintain $CO_2$ below supercritical pressure conditions;
   c. maintaining the contact of the $CO_2$ or $CO_2$-rich mixture with the heavy oil residue below about 73 bar until a predetermined concentration of dissolved $CO_2$ is attained and the viscosity of the heavy oil residue is reduced;
   d. pumping and atomizing the reduced-viscosity heavy oil residue for combustion in a combustion chamber.

2. The method of claim 1, further comprising, after step (c), transporting the reduced-viscosity heavy oil residue via a pipeline to the combustion system.

3. The method of claim 1, further comprising introducing the reduced-viscosity heavy oil residue with dissolved $CO_2$ into a pressurized heated storage vessel under predetermined conditions of temperature and pressure to maintain the viscosity of the heavy oil residue within a prescribed viscosity range, and passing the reduced-viscosity heavy oil residue from the storage vessel and atomizing it for combustion in a combustion chamber.

4. The method of claim 1 wherein the $CO_2$ or $CO_2$-rich mixture and heavy oil residue are contacted in an agitated mixing vessel under an atmosphere of pressurized gaseous $CO_2$.

5. The method of claim 1 wherein the $CO_2$ or $CO_2$-rich mixture is introduced into a moving stream of the heavy oil residue and passed through a static or dynamic in-line mixing device to dissolve the $CO_2$ in the heavy oil residue.

6. The method of claim 1, wherein the atomization of the reduced-viscosity heavy oil residue is accomplished by an atomizing media including steam and/or $CO_2$.

7. The method of claim 1, wherein the atomization of the reduced-viscosity heavy oil residue is accomplished by one or more mechanical atomization injectors.

8. The method of claim 1, wherein the source of $CO_2$ or a $CO_2$-rich gaseous mixture is provided from an integrated $CO_2$ capture and processing unit.

9. The method of claim 1, wherein the source of $CO_2$ or a $CO_2$-rich gaseous mixture is provided from at least a two-stage $CO_2$ capture and processing unit, each stage delivering $CO_2$ or a $CO_2$-rich gaseous mixture at different pressures.

10. The method of claim 1, wherein combustion occurs in the presence of air, oxygen or oxygen-enriched air.

11. The method of claim 1, further comprising
   e. passing flue gases from the combustion chamber to one or more flue gas treatment units;
   f. passing effluent flue gases from the one or more flue gas treatment units to a $CO_2$ capture unit; and
   g. passing at least a portion of $CO_2$ from the $CO_2$ capture unit to step (b).

12. The method of claim 1, wherein the mixture of $CO_2$ (or $CO_2$-rich mixture) and heavy oil is maintained in a storage tank prior to pumping to the combustion chamber.

* * * * *